United States Patent

Sturm et al.

[11] Patent Number: 5,864,059
[45] Date of Patent: Jan. 26, 1999

[54] SELF-RECORDING SNOW DEPTH PROBE

[75] Inventors: Matthew Sturm; Jonathan A. Holmgren, both of Fairbanks, Ak.

[73] Assignee: The Army Corps of Engineers as represented by the Secretary of the Army, Washington, D.C.

[21] Appl. No.: 871,620

[22] Filed: Jun. 9, 1997

[51] Int. Cl.[6] ........................................ G01B 5/06
[52] U.S. Cl. .............................................. 73/432.1
[58] Field of Search ..................... 73/305, 308, 312–314, 73/319, 321, 322, 432.1, 866.5; 33/700, 704, 783, 806, DIG. 1, 832, 834; 324/207.21, 207.24

[56] References Cited

U.S. PATENT DOCUMENTS

| | | | |
|---|---|---|---|
| 3,432,933 | 3/1969 | Wood | 33/834 |
| 3,881,256 | 5/1975 | Jewell et al. | 33/834 |
| 4,600,842 | 7/1986 | Boschung et al. | 73/293 X |
| 4,839,590 | 6/1989 | Koski et al. | 324/207.24 |
| 5,640,880 | 6/1997 | Mulrooney et al. | 73/313 |

FOREIGN PATENT DOCUMENTS 0195104  11/1984  Japan ........................................ 33/834

Primary Examiner—Robert Raevis
Attorney, Agent, or Firm—Luther A. Marsh

[57] ABSTRACT

A snow probe device with a portable data logger that measures snow depths in snow covered areas. The snow probe componets include: i) a linear displacement magnetostrictive transducer composed of a long probe shaft with an internal magnetostrictive transducer filament that operates in conjunction with a small electronics package for signal generation and detection; ii) a floating plate assembly that includes a magnet that slides on the probe shaft along with a floating plate that rests upon the snow's surface during a measurement event; iii) a pointed tip designed for easy penetration of snow attached at the probe's bottom end portion; iv) a thumb switch for actuating measurements on a cylindrical handle attached at the upper end of the probe shaft; and v) a data logger for controlling and recording the magnetostrictive transducer measurements. Optionally, the device can include a polar fleece sleeve to thermally insulate the transducer's electronics package and a digital counter to record the number of measurements performed.

6 Claims, 2 Drawing Sheets

SELF-RECORDING SNOW DEPTH PROBE

STATEMENT OF GOVERNMENT INTEREST

The invention described herein may be manufactured and used by or for the United States Government for governmental purposes without the payment of any royalties thereon.

FIELD OF THE INVENTION

The invention is a device for providing snow depth data. In particular, the invention enables compilation of extensive snow depth data by a human operator that correspond to locations distributed over a large snow covered area, this done with minimal human error and effort.

BACKGROUND OF THE INVENTION

Devices that provide depth data of a snow covered area are used for determining: i) water resources for spring run-off, ii) snow thickness for climate model, iii) depth during the building of snow roads, snow runways, or structural foundations on the snow, and iv) a vehicle's ability to move through snow. These snow depth data for a snow covered area is compiled from a large number of snow depth measurements along traverse lines ranging from 30 to 500 feet in length. Prior known devices include using a thin cylindrical probe with an attached measuring tape. This type of probe is first pushed into the snow, then an operator bends over and reads the tape value at the snow surface, and then hand records this reading in a field book. This device and method is slow and tedious, e.g. a 100 measurements typically requires over 30 minutes to perform, and over 20 minutes to enter this compiled data in a computer data base. Human errors are common during this manual data recording. Thus, a portable snow depth measurement device is needed that is faster and easier to use, as well as eliminating the need for manual data entry.

Another device that provides snow depth data is taught in U.S. Pat. No. 4,600,842 by Boshung et al. entitled "Snowfall Measuring Method & Apparatus." This teaching discloses a stationary device with a rack component alone with an attached probe that is raised and lowered towards a fixed reference ground plate for measurements of snow depth performed by the device's electronics package that includes an alarm and a processor component. However, this device is not adaptable for portable repositioning for measurements at varied locations as provided for by the instant invention.

The problems discussed above are resolved by the instant invention by use of a probe with a linear displacement magnetostrictive transducer for reliable snow depth measurements in combination with a data logger that automatically records these measurements, and that can readily be downloaded to another computer for data analysis or graphical presentation.

SUMMARY & OBJECTS OF THE INVENTION

The invention is a snow probe device with a portable data logger that measures snow depths in snow covered areas. The snow probe components include: i) a linear displacement magnetostrictive transducer composed of a long probe shaft with an internal magnetostrictive transducer filament that operates in conjunction with a small electronics package for signal generation and detection; ii) a floating plate assembly that includes a magnet that slides on the probe shaft along with a floating plate that rests upon the snow's surface during a measurement event; iii) a pointed tip designed for easy penetration of snow attached at the probe's bottom end portion; iv) a thumb switch for actuating measurements on a cylindrical handle attached at the upper end of the probe shaft; and v) a data logger for controlling and recording the magnetostrictive transducer measurements. Optionally, the device can include a polar fleece sleeve to thermally insulate the transducer's electronics package and a digital counter to record the number of measurements performed.

Accordingly, several objects of the present invention are:

To provide a snow probe device for measuring snow depth that records data automatically on a data logger and on a solid state storage module that can be directly down-loaded to a computer.

To provide a snow probe device for measuring snow depth that is portable, operates at temperatures as low as −25° F., and can run more than a week on one charge of the batteries.

To provide a snow probe device for measuring snow depth that uses a magnetostrictive transducer with a sliding plate attached to a collar with magnet to measure distance of snow penetration.

To provide a snow probe device for measuring snow depth that includes an anti-bounce (i.e., no double recording of data at a point), snow compaction corrections, and temperature compensation algorithms in the device's data logger operation.

To provide a snow probe device with data logger for collecting distributed depth measurements that yield extensive and consistent snow depth measurement data.

Still further advantages will become apparent from consideration of the ensuing detailed description and drawings.

BRIEF DESCRIPTION OF THE DRAWING

FIG.3 shows a side view of FIG. 2 with top on.

DETAILED DESCRIPTION OF THE INVENTION

Figure 1:
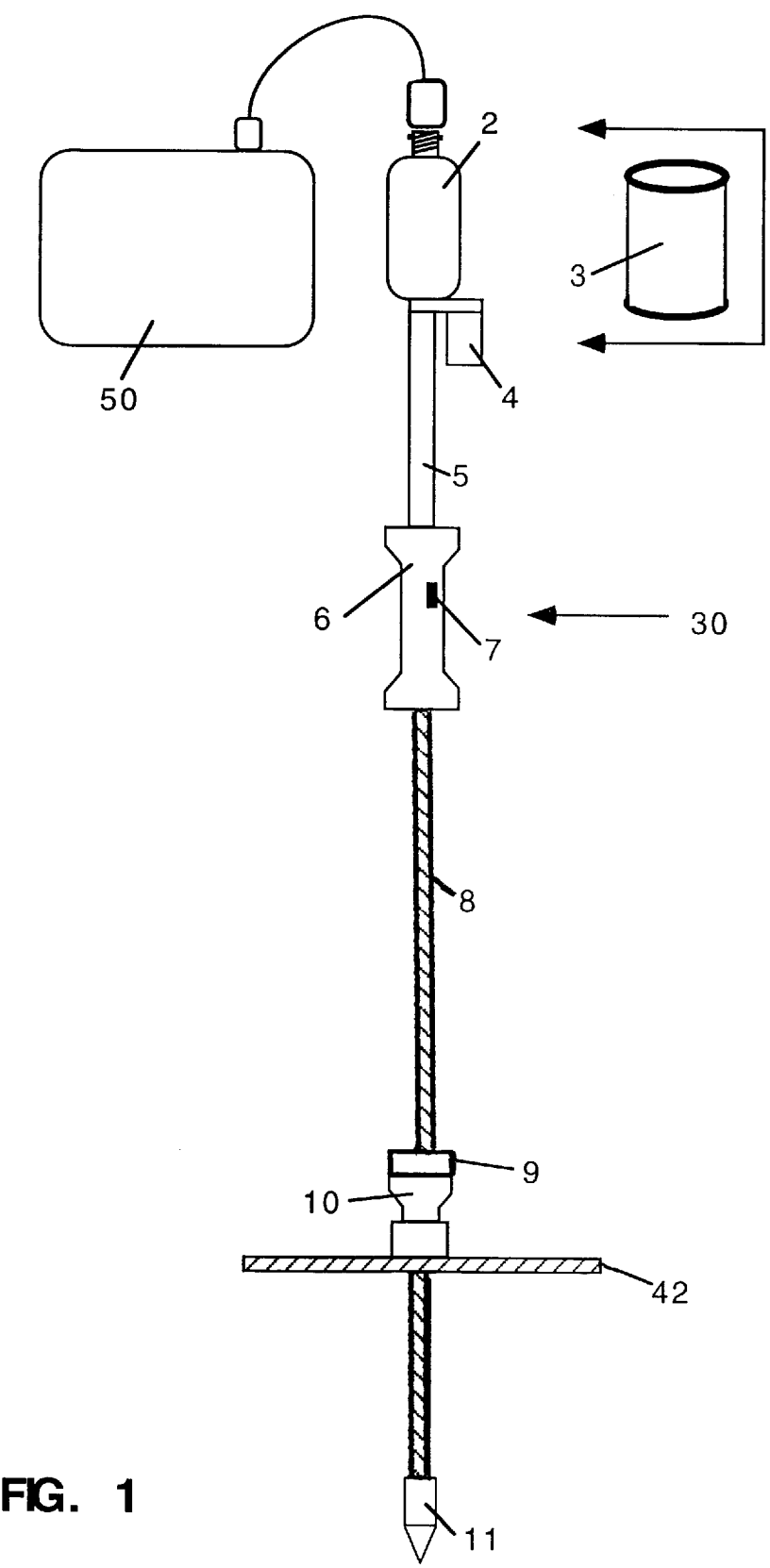
FIG.1 shows the snow probe with data logger in a diagrammatic side view.
Figure 2:
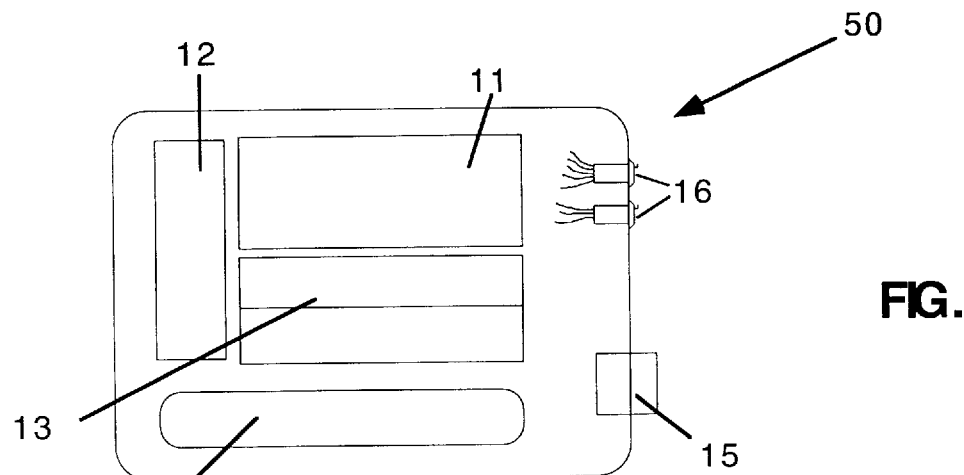
FIG.2 shows the data logger unit in a top view with internal components exposed.
Figure 3:
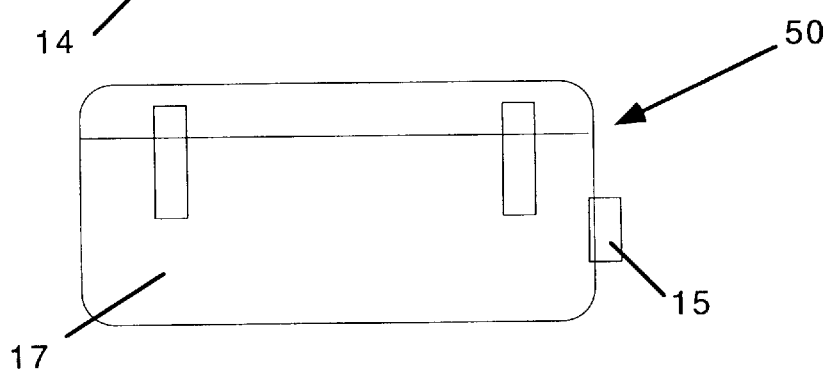
Figure 4:
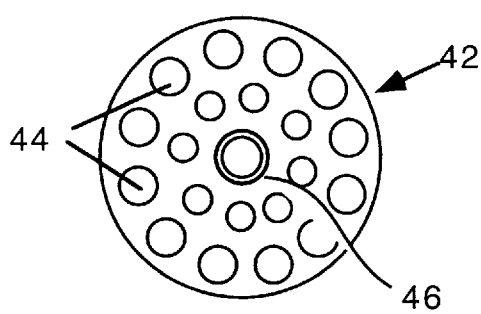
FIG.4 shows the screw-on floating plate in a top view that attaches to the slider floating plate assembly.
Figure 5:
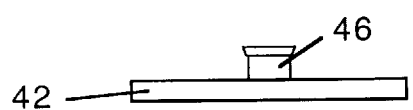
FIG.5 shows a side view of FIG.4.

FIGS. 1–5 shows the invention's snow probe 30 with data logger 50. The snow probe 30 includes: i) a long steel shaft 8, that is approximately 65" long, although various shaft lengths are possible, and 0.4" in diameter and is typically made of stainless steel that includes an internal magnetostrictive transduction filament element that operates in combination with an electronics package 2 to form a linear displacement magnetostrictive transducer, such a unit is made by Lucas Shaevitz and can be a MagnaRule Plus linear displacement transducer model MRU-060-000; the operation and design of this type of transducer is taught in U.S. Pat. Nos. 5,017,867 & 5,150,049; ii) a floating plate assembly 40 that a) slides on the shaft 8 and b) includes an annular magnet 9 mounted and attached with non-magnetic screws on top of a non-magnetic aluminum slider 10 whose lower end has threads that accents a screw-on floating plate 42 with lighting holes 44. The aluminum collar 46 is attached to plate 42 that in turn attaches to slider 10. The plate 42 is typically made of high density polystyrene and is about nine inches in diameter. Linear displacement transduction occurs when magnet 9 causes changes in the magnetostrictive filament within shaft 8; iii) a pointed tip 11 with a 45° included angle designed for snow penetration that is made of stainless steel and epoxied to shaft 8; iv) a thumb microswitch 7 mounted to a cylindrical plastic handle 6, the handle is threaded to an aluminum spacer sleeve 5 that in turn is threaded and attached at top and bottom to electronics package 2 and shaft 8 respectively; v) from the electronics package 2, wires lead to a data logger unit 50. The probe electronics package 2 is self-heated sufficiently to keep the electronics warm under normal operation. Optionally, a polar-fleece sleeve 3 can be used in extreme cold conditions to insulate electronics package 2; and a digital counter 4 can record the number of measurements performed and displayed digitally.

The data logger unit 50 is a weatherproof, small back pack unit that includes batteries 12 & 14, data storage device 13, alarm 15, and a data acquisition and controller/processor 11. The controller/processor 11 is a solid-state, low power unit, e.a. a Campbell model CR-10, that is small, rugged and sealed. The controller/processor 11 can, e.g. record 12 analog inputs, and has 8 control ports including 12 volts-dc switching. Operation is controlled by a program that uses an internal instruction language; programming is introduced by means of the keypad or computer using a series of instruction codes. Battery 12 is typically a 12 volts-dc, 6 amp-hour gel-cell, that provides power to the controller/processor 11. Data acquisition is initiated through on/off switch 7. Switch 7 is a sensitive thumb controlled micro-switch that can be easily activated with a gloved hand. The solid-state data storage device 13 can be a Campbell model SM-192 which can store approximately 92,000 four-digit numbers and retain them even when power to the controller processor is turned off. The batteries 14 can be 2–12 volt gel cells in series for 24 volts-dc excitation of the linear displacement magnetostrictive transducer's shaft 8 filament and electronics package 2 which are also wired through an on/off switch. Alarm buzzer 15 can be a 12 volt audible buzzer that is actuated by data logger 50 when on/off switch 7 is closed that indicates when a measurement has been taken. Wire plugs 16 provide attaching points for a wire harness to the snow probe 30. The controller/processor and batteries is in housing 17 which is a waterproof foam-lined sack case with latches for easy opening. This is generally placed in a backpack during use.

The snow probe 30 is held like a tall walking stick as the operator moves through the snow. At a desired location for snow depth measurement, the probe 30 is pushed down, point 11 fore-most to the ground, The plate assembly 40 "floats" on the surface of the snow and therefore can slide on the steel shaft 8 as the probe 30 is pushed down. The floating plate 42 is removable for easy storage of the probe 30 in a protective tube during transport. Once the probe 30 has been pushed to the ground, the switch 7 is triggered and causes the probe 30 to make a displacement reading from the tip of the probe to the base of floating plate 42. The transduced displacement signal is generated and detected by the magnetostrictive transducer and then sensed by the data logger 50 and then stored in the solid-state storage device 13. An audible buzzer 15 sounds when data has been recorded.

The data acquisition controller/processor 11 includes software programming that provides an operator with logger adjustment capabilities for adjusting signals from the magnetostrictive transducer using calibration coefficients, for "anti-bounce" to prevent double recordings of data at: a given point during a single actuation of the switch 7, snow compaction correction factors for fluffy snow conditions, and temperature compensation algorithms for offsets in the position of the floating plate assembly 40 due to instrument calibration and temperature-induced variations of the magnetostrictive transducer.

The programming of the controller/processor 11 can be as follows for snow: 1) Initiate program, looping every 0.125 seconds; 2) Check control port that is actuated by switch 7; 3) If control port is LOW, return to program beginning; if HIGH continue; 4) Measure voltage from magnetostrictive transducer: 5) Use calibration factors to convert voltage to depth; 6) Apply a snow compaction additive correction factor; 7) Measure air temperature using, thermistor probe incorporated in the probe 30; 8) Apply air temperature multiplicative correction; 9) Increment measurement counter; 10) Send power to buzzer 15; 11) Output data to solid state storage device 13; 12) Wait 1.2 seconds which is an "anti-bounce" loop; and 13) Return to program beginning. Other uses of the invention where portability is a prerequisite include depth measurements of unconsolidated material or foam where the floating plate assembly 40 is modified so as to reside at the material's top surface during a depth measurement.

While this invention has been described in terms of specific embodiments, it is understood that the invention is capable of further modification and adaptation following in general the principle of the invention and including such departures from the present disclosure as come within the known or customary practice in the pertinent arts and may be applied to the central features set forth, and fall within the scope of the invention and of the limits of the appended claims.

We claim:

1. A depth measurement device of snow material comprising:
    a penetrating drive tip member that is attached to a shaft member with a magnetostrictive transducer filament disposed within the shaft member;
    the magnetostrictive transducer filament is connected to an electronic generating and detecting means which together forms a linear displacement magnetostrictive transducer;
    a floating plate assembly that slides on the shaft member that includes i) an annular magnet mounted to ii) a non-magnetic slider member with iii) a floating plate, whereby linear displacement transduction occurs by the annular magnet causing changes in the magnetostrictive filament;
    a handle member shaped for human hand grip that is attached to the top of the shaft member, the handle member has an electrical switching means for controlling actuation of measurement sequence including recording of a signal from the magnetostrictive transducer to a data logger unit consisting of a weatherproof small pack unit that includes electrical power sources for the magnetostrictive transducer, a data storage device, an alarm and a processor whereby a human operator can reposition the device at multiple locations and control measurement operation; and
    the data logger unit is electronically coupled to the magnetostrictive transducer for recording the measurement event in a memory storage device.

2. The depth measurement device of claim 1 wherein the floating plate is removable from the floating plate assembly for ease of probe storage during transport.

3. The depth measurement device of claim 2 wherein the floating plate has lightning holes, the floating plate is made of high density polystyrene.

4. The depth measurement device of claim 1 wherein the processor includes a programming means for logger operational adjustments of i) anti-bounce to prevent double recording of a measured event at a given point during a single actuation of the electrical switching means, ii) snow compaction correction factors for snow that is fluffy, and iii) temperature compensation for offsets in the position of the floating plate assembly due to instrument calibration and temperature-induced variations of the device.

5. the depth measurement device claim 1 wherein the device further includes a polar fleece sleeve to thermally insulate the magnetostrictive transducer's electronic generating and detecting means.

6. The depth measurement device of claim 1 wherein the device further includes a digital counter for recording the number of measurements performed.

* * * * *